(12) United States Patent
Karczewicz et al.

(10) Patent No.: US 11,381,847 B2
(45) Date of Patent: Jul. 5, 2022

(54) COEFFICIENT CODING FOR TRANSFORM SKIP MODE IN VIDEO CODING

(71) Applicant: QUALCOMM Incorporated, San Diego, CA (US)

(72) Inventors: Marta Karczewicz, San Diego, CA (US); Hongtao Wang, San Diego, CA (US); Muhammed Zeyd Coban, Carlsbad, CA (US); Yung-Hsuan Chao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/886,381

(22) Filed: May 28, 2020

(65) Prior Publication Data

US 2020/0382813 A1    Dec. 3, 2020

Related U.S. Application Data

(60) Provisional application No. 62/888,954, filed on Aug. 19, 2019, provisional application No. 62/881,913, (Continued)

(51) Int. Cl.
*H04N 19/88* (2014.01)
*H04N 19/124* (2014.01)
*H04N 19/129* (2014.01)

(52) U.S. Cl.
CPC ........... *H04N 19/88* (2014.11); *H04N 19/124* (2014.11); *H04N 19/129* (2014.11)

(58) Field of Classification Search
CPC ..... H04N 19/88; H04N 19/124; H04N 19/129
See application file for complete search history.

(56) References Cited

U.S. PATENT DOCUMENTS

| 2014/0133574 A1* | 5/2014 | Lee ........................ | H04N 19/70 375/240.18 |
| 2015/0249828 A1* | 9/2015 | Rosewarne ............ | H04N 19/60 375/240.02 |

(Continued)

FOREIGN PATENT DOCUMENTS

WO      2020118212      6/2020

OTHER PUBLICATIONS

Bross (Fraunhofer) B., et al., "Non-CE8: Unified Transform Type Signalling and Residual Coding for Transform Skip", 13. JVET Meeting, Jan. 9, 2019-Jan. 18, 2019, Marrakech, (The Joint Video Exploration Team of ISO/IEC JTC1/SC29/WG11 and ITU-T SG.16), No. JVET-M0464, Jan. 3, 2019, (Jan. 3, 2019), XP030200509, 11 Pages, Retrieved from the Internet: URL: http://phenix.int-evry.fr/jvet/doc_end_user/documents/13_Marrakech/wg11/JVET-M0464-v1.zip JVET-M0464.docx, Section 3, "Residual Coding for TransformSkip" on p. 3-5.

(Continued)

*Primary Examiner* — Nasim N Nirjhar
(74) *Attorney, Agent, or Firm* — Shumaker & Sieffert P.A.

(57) ABSTRACT

Techniques for coding coefficients in a residual block are described. A video coder (e.g., video encoder or video decoder) may code (e.g., encode or decode), in an interleaving manner, coefficient information on a coefficient-by-coefficient basis for coefficients in a residual block of a current block of the video data in a first pass, wherein the coefficient information for a coefficient includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective (Continued)

threshold values, and after the first pass, code remainder information for coefficients in the residual block of the current block in a second pass.

22 Claims, 8 Drawing Sheets

Related U.S. Application Data filed on Aug. 1, 2019, provisional application No. 62/868,776, filed on Jun. 28, 2019, provisional application No. 62/855,758, filed on May 31, 2019.

(56) References Cited

U.S. PATENT DOCUMENTS

| | | | |
|---|---|---|---|
| 2020/0322607 A1* | 10/2020 | Hsiang | H04N 19/70 |
| 2020/0374560 A1* | 11/2020 | Zhao | H04N 19/60 |

OTHER PUBLICATIONS

Chen J., et al., "Non-CE1: Throughput Improvement on CABAC Coefficients Level Coding", 8. JCT-VC Meeting, 99. MPEG Meeting, Feb. 1, 2012-Feb. 10, 2012, San Jose, (Joint Collaborative Team on Video Coding of ISO/IEC JTC1/SC29/WG11 and ITU-T SG.16), URL: http://wftp3.itu.int/av-arch/jctvc-site/, No. JCTVC-H0554, Jan. 24, 2012 (Jan. 24, 2012), XP030111581, 6 Pages, abstract.

International Search Report and Written Opinion—PCT/US2020/035301—ISAEPO—dated Aug. 27, 2020 (19 pp).

Karczewicz (Qualcomm) M, et al., "CE7-Related: Interleaved Coefficient Coding for Transform-Skip Mode", 15. JVET Meeting, Jul. 3, 2019-Jul. 12, 2019, Gothenburg, (The Joint Video Exploration Team of ISO/IEC JTC1/SC29/WG11 and ITU-T SG.16), No. JVET-O0623, Jul. 2, 2019 (Jul. 2, 2019), XP030220077, 5 Pages, Retrieved from the Internet: URL: http://phenix.int-evry.fr/jvet/doc_end_user/documents/15_Gothenburg/wg11/JVEI -O0623-v2.zip JVET-00623-v1.docx, the whole document.

Karczewicz (Qualcomm) M., et al., "CE8-Related: Sign Context Modelling and Level Mapping for TS Residual Coding", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0455, Mar. 21, 2019 (Mar. 21, 2019), XP030204274, 5 Pages, Retrieved from the Internet: URL: http://phenix.int-evry.fr/jvet/doc_end_user/documents/14_Geneva/wg11/JVET-N0455-v3.zip JVET-N0455_r3.docx, Abstract, Section 1.2, "Level mapping".

Kim S H., et al., "Non-CE1: High Throughput Binarization (HTB) Method with Modified Level Coding", 8. JCT-VC Meeting, Feb. 1, 2012-Feb. 10, 2012, San Jose, (Joint Collaborative Team on Video Coding of ISO/IEC JTC1/SC29/WG11 and ITU-T SG.16), No. JCTVC-H0510, Feb. 1, 2012 (Feb. 1, 2012), XP030232037, 8 Pages, Retrieved from the Internet: URL: http://phenix.int-evry.fr/jct/doc_end_user/documents/8_San%20Jose/wg11/JCTVC-H0510-v2.zip JCTVC-H0510-r1.doc, abstract figure 1.

Schwarz (Fraunhofer) H, et al., "Description of Core Experiment 7 (CE7): Quantization and Coefficient Coding", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N1027, Mar. 27, 2019 (Mar. 27, 2019), XP030256982, 10 Pages, Retrieved from the Internet: URL: http://phenix.int-evry.fr/jvet/doc_end_user/documents/14_Geneva/wg11/JVET-N1027-v1.zip JVET-N1027-v1.docx, the whole document.

Bossen F., et al., "JEM Software Manual," Joint Collaborative Team on Video Coding (JCT-VC) of ITU-T SG16 WP3 and ISO/IEC JTC1/SC29/WG11, Document: JCTVC—Software Manual, Retrieved on Aug. 3, 2016, pp. 1-29.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-V7, 386 Pages.

Bross et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020, Document: JVET-R2001-v8, 528 Pages.

Bross (Fraunhofer) B, et al., "Non-CE8: Unified Transform Type Signalling and Residual Coding for Transform Skip", 13. JVET Meeting, Jan. 9, 2019-Jan. 18, 2019, Marrakech, (The Joint Video Exploration Team of ISO/IEC JTC1/SC29/WG11 and ITU-TSG. 16), No. JVET-M0464, Jan. 15, 2019 (Jan. 15, 2019), XP030202239, 13 pages, Retrieved from the Internet: URL: http://phenix.int-evry.fr/jvet/doc_end_user/documents/13_Marrakech/wg11/JVET-M0464-v4.zip JVET-M0464-v4.docx, p. 4.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.

ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.

Karczewicz et al., "CE7-related: Interleaved Coefficient Coding for Transform-Skip Mode", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0623-v4, 9 Pages.

* cited by examiner

|  | Coeff0 | Coeff1 | Coeff2 | | CoeffN-1 |
|---|---|---|---|---|---|
| First Pass | Sig / Sign / GT1 | Sig / Sign / GT1 | Sig / Sign / GT1 | ••• | Sig / Sign / GT1 |
| Second Pass | GT2 / GT3 / GT4 / GT5 / Par | GT2 / GT3 / GT4 / GT5 / Par | GT2 / GT3 / GT4 / GT5 / Par | ••• | GT2 / GT3 / GT4 / GT5 / Par |
| Third Pass | Rem | Rem | Rem | ••• | Rem |

FIG. 5

|  | Coeff0 | Coeff1 | Coeff2 | | CoeffN-1 |
|---|---|---|---|---|---|
| First Pass | Sig / Sign / GT1 / GT2 | Sig / Sign / GT1 / GT2 | Sig / Sign / GT1 / GT2 | ••• | Sig / Sign / GT1 / GT2 |
| Second Pass | GT3 / GT4 / GT5 / Par | GT3 / GT4 / GT5 / Par | GT3 / GT4 / GT5 / Par | ••• | GT3 / GT4 / GT5 / Par |
| Third Pass | Rem | Rem | Rem | ••• | Rem |

FIG. 6

COEFFICIENT CODING FOR TRANSFORM SKIP MODE IN VIDEO CODING

This application claims the benefit of U.S. Provisional Patent Application 62/855,758, filed May 31, 2019, U.S. Provisional Patent Application 62/868,776, filed Jun. 28, 2019, U.S. Provisional Patent Application 62/881,913, filed Aug. 1, 2019, and U.S. Provisional Application 62/888,954, filed Aug. 19, 2019, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coefficient coding such as in examples of transform skip mode. In transform skip mode, rather than performing transformation of residual data from one domain to another (e.g., sample domain to transformed domain), the transformation is skipped. The residual data may be the difference between a current block and a prediction block. In such cases, the coefficient values may be the values of the residual data (e.g., values of a residual block), possibly with quantization.

The example techniques described in this disclosure relate to techniques of coding (e.g., encoding or decoding) the coefficient when transformation of the residual data is skipped (e.g., transform skip mode). In some examples, a video coder codes the coefficient information for the coefficients using level values and sign information. Sign information indicates whether the coefficient value is positive or negative. Level values, in combination with parity values, indicate whether the coefficient value is greater than 0, 1, 2, etc., as a few non-limiting examples.

In some examples, in transform skip mode, the level values and the sign information of neighboring coefficients may be more correlated than in examples where transform is applied. This disclosure describes example techniques that may utilize the correlation between neighboring coefficients as a way to increase coding efficiency. In this manner, the example techniques provide a practical application to increase coding efficiency in the video coding technology.

This disclosure also describes examples for interleaved coefficient coding. In the interleaved coefficient coding, level values are coded (e.g., encoded or decoded) on a coefficient-by-coefficient basis in the same pass as other coefficient information such as sign information and parity information. Then, in a second pass, the remainder values are coded coefficient-by-coefficient. With such interleaved coefficient coding, the example techniques may promote better use of coding techniques, as described in more detail. In this way, the example techniques provide a technical solution to technical problems in video coding, such as by providing a practical application for coefficient coding in the video coding process.

In one example, the disclosure describes a method of coding video data, the method comprising coding, in an interleaving manner, coefficient information on a coefficient-by-coefficient basis for coefficients in a residual block of a current block of the video data in a first pass, wherein the coefficient information for a coefficient includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values, and after the first pass, coding remainder information for coefficients in the residual block of the current block in a second pass.

In one example, the disclosure describes a device for coding video data, the device comprising a memory configured to store video data and processing circuitry configured to code, in an interleaving manner, coefficient information on a coefficient-by-coefficient basis for coefficients in a residual block of a current block of the video data in a first pass, wherein the coefficient information for a coefficient includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values, and after the first pass, code remainder information for coefficients in the residual block of the current block in a second pass.

In one example, the disclosure describes a computer-readable storage medium having stored thereon instructions that, when executed, cause one or more processors to code, in an interleaving manner, coefficient information on a coefficient-by-coefficient basis for coefficients in a residual block of a current block of the video data in a first pass, wherein the coefficient information for a coefficient includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values, and after the first pass, code remainder information for coefficients in the residual block of the current block in a second pass.

In one example, the disclosure describes a device for coding video data, the device comprising means for coding, in an interleaving manner, coefficient information on a coefficient-by-coefficient basis for coefficients in a residual block of a current block of the video data in a first pass, wherein the coefficient information for a coefficient includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values, and means for coding remainder information for coefficients in the residual block of the current block in a second pass, after the first pass.

The details of one or more examples are set forth in the accompanying drawings and the description below. Other features, objects, and advantages will be apparent from the description, drawings, and claims.

BRIEF DESCRIPTION OF DRAWINGS

FIG. 5 is a conceptual diagram illustrating another example of coding coefficient information for coefficients.

FIG. 6 is a conceptual diagram illustrating another example of coding coefficient information for coefficients.

DETAILED DESCRIPTION

Figure 1:
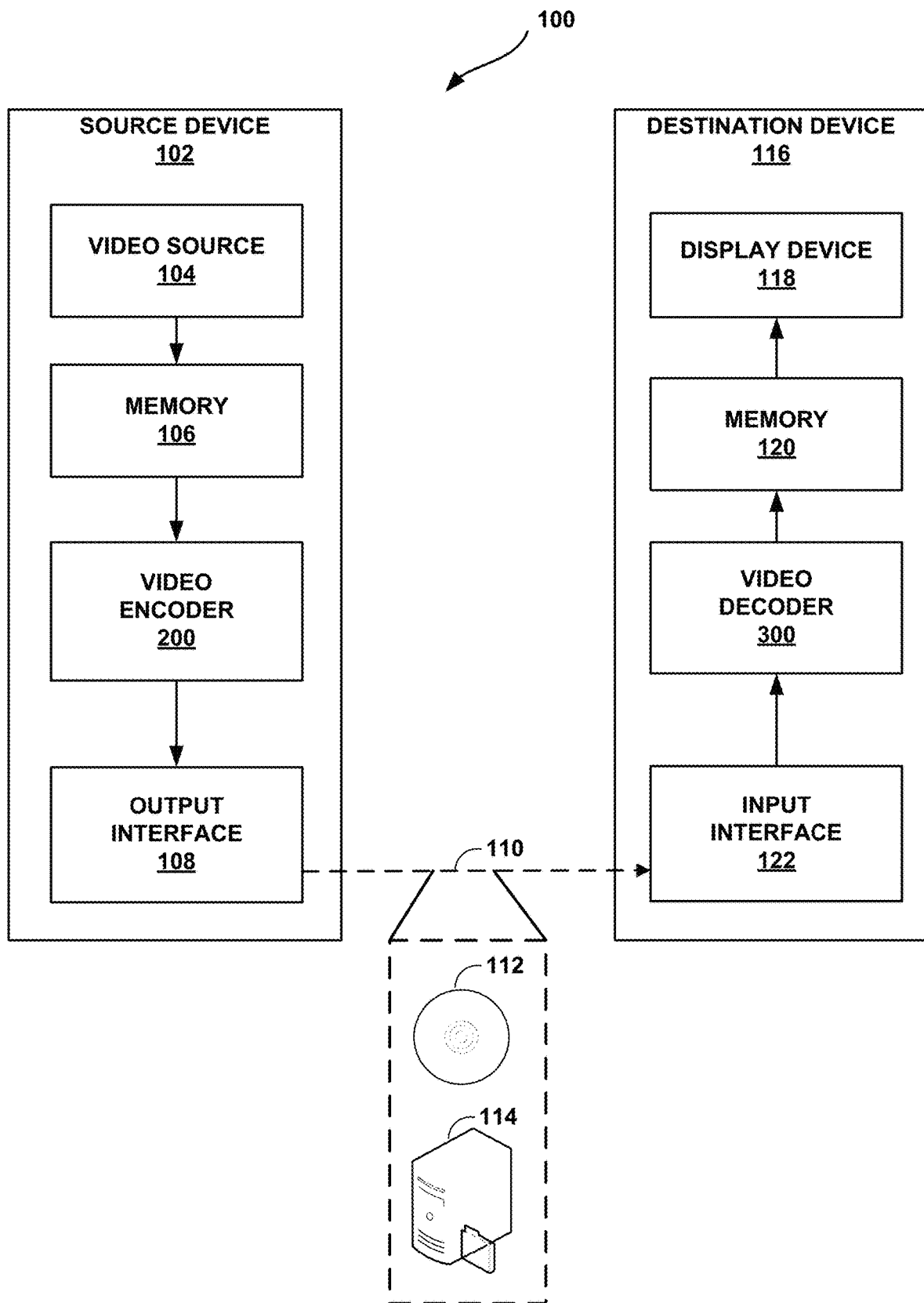
FIG. 1 is a block diagram illustrating an example video encoding and decoding system that may perform the techniques of this disclosure.

In video coding, a video encoder determines a prediction block for a current block. In some examples, the prediction block may include samples or interpolated samples from a reference picture, such as in inter-prediction. In some examples, the prediction block may include samples generated from samples in the same picture as the current block, such as in intra-prediction. Intra-block copy may be similar to inter-prediction, but the prediction block is from the same picture as the current block. The video encoder determines a difference between the prediction block and the current block to generate a residual block of the current block.

In some techniques, the video encoder performs a transform on the residual block. For example, the samples in the residual block may be considered to be in the pixel domain or sample domain, and the video encoder transforms the samples in the pixel domain to a frequency or transform domain. The result of the transform is a block of coefficients that may be quantized and then encoded.

In some examples, the video encoder skips the transform step (i.e., in transform-skip mode). In the transform-skip mode, the coefficients may be the same as the samples of the residual block. The coefficients may then be quantized and then encoded.

The example techniques described in this disclosure may relate to ways in which the coefficients are processed for encoding. The term "coefficients" may refer to coefficients for a residual block of the current block where transform is skipped on the residual block or where transform is performed on the residual block. For ease of illustration, the example techniques are described with respect to transform-skip mode. However, the techniques may be applicable to examples where transform is performed.

For the video encoder to signal information for the coefficients, the video encoder may be configured to encode coefficient information that a video decoder receives to determine the value of the coefficient. Examples of the coefficient information include a significance flag (e.g., a flag that indicates whether a value of a coefficient value is not zero), a parity flag (e.g., a flag that indicates whether the value of the coefficient is odd or even), a sign flag (e.g., a flag that indicates whether the value of the coefficient is positive or negative), and one or more greater than flags, that in combination with the parity flag, indicate whether an absolute value of the coefficient is greater than respective threshold values.

The "greater than" flags are referred to as "gt" flags and are each associated with a threshold value. The gt flags by themselves may not be sufficient to indicate whether the value of a coefficient is greater than their respective threshold value. As an example, if the gt2 (e.g., greater than 2) flag is 0, it does not necessarily follow that the value of the coefficient cannot be 3. Rather, the combination of the parity flag and the gt2 flag together may indicate the value.

For example, if the value of the coefficient is 3, then the parity flag is 1, to indicate an odd value, and the gt1 flag is 1 to indicate that the value is greater than the one, but the gt2 flag may be 0. In this example, the video decoder may determine that the value is greater than 1 because the gt1 flag is 1 and determine that the value is odd because the parity flag is 1. Therefore, because the value is greater than 1 and odd, the value cannot be 2. Accordingly, the value can be 3, 5, 7 . . . etc. Also, the gt2 flag is 0, and therefore, based on the combination of gt2 flag being 0 and the coefficient being odd, the video decoder may determine that the value of the coefficient cannot be greater than 3 and is 3. If the coefficient value were 5 instead of 3, then the g2 flag would have been 1.

Using the level flags and parity flag, it may be possible to represent values up to 9, assuming that the last greater than flag is the greater than 5 (e.g., gt5) flag. For values greater than 9, the video encoder may signal a remainder value. The remainder value is the remaining absolute value of a coefficient.

In this disclosure, the sig_coeff_flag refers to the significance flag that indicates whether the value of a coefficient is not zero. The par_level_flag refers to the parity flag that indicates whether the value of a coefficient is odd or even. The coeff_sign_flag refers to the sign flag that indicates whether the value of the coefficient is positive or negative. The abs_level_gtX_flags refer to the flags that indicates whether the value of a coefficient value is greater than a particular threshold. For example, abs_level_gtx_flag[n][j] specifies whether the absolute value of the coefficient level (at scanning position n) is greater than (j<<1)+1. When abs_level_gtx_flag[n][j] is not present, it is inferred to be equal to 0. The gtx (or greater than) flags may be referred to as flags for level values. However, the gtx flag by itself may not specify whether a value is greater than a threshold For example, gt2 value of 0 does not necessarily mean that the value of the coefficient cannot be 3.

The abs_remainder refers to the information signaled for the remainder. For example, abs_remainder[n] is the remaining absolute value of a coefficient level that may be coded with Golomb-Rice code at the scanning position n. When abs_remainder[n] is not present, it is inferred to be equal to 0.

The video decoder receives the various coefficient information (e.g., the sig_coeff_flag, par_level_flag, coeff_sign_flag and all the abs_level_gtX_flags and the abs_remainder) and determines the coefficient value for a coefficient based on the coefficient information. The video decoder may then perform inverse-quantization (if needed) and inverse-transform (if needed) to generate the sample values of the residual block. In one or more examples, the video decoder may skip the inverse-transform since the coefficients may be generated by the video encoder in transform-skip mode.

The video decoder may determine a prediction block using the same techniques as the video encoder. For example, the video encoder may signal information to the video decoder that allows the video decoder to determine the same prediction block as the video encoder. The video decoder then adds the prediction block and residual block together to reconstruct the current block.

In some techniques, the video encoder may signal the coefficient information in a bitplane-by-bitplane basis. For example, the video encoder may encode the sig_coeff_flag (e.g., flag of whether the value of the coefficient is non zero) for each coefficient in the block of coefficients, forming a bitplane of sig_coeff_flag values. Then, the video encoder may encode the par_level_flag (e.g., flag of whether the value of the coefficient is even or odd) for each coefficient in the block of coefficients, forming a bitplane of par_level_flag values, and so forth.

This disclosure describes example techniques in which the video encoder encodes a plurality of the coefficient information on a coefficient-by-coefficient basis in a first pass through the coefficients. Then, in subsequent passes, the video encoder may encode any remaining coefficient information in a coefficient-by-coefficient basis or bitplane-by-bitplane basis.

In the coefficient-by-coefficient basis of encoding coefficient information, the video encoder may interleave different coefficient information. For example, the video encoder may encode the sig_coeff_flag, par_level_flag, coeff_sign_flag and all the abs_level_gtX_flags for the first coefficient. Then, the video encoder may encode the sig_coeff_flag, par_level_flag, coeff_sign_flag and all the abs_level_gtX_flags for the second coefficient, and so forth, in a first pass through the coefficients of the residual block of the current block. In one or more examples, the video encoder may then, in a second pass through the coefficients, encode the abs_remainder values in a coefficient-by-coefficient basis. In the bitplane-by-bitplane basis of encoding coefficient information, the video encoder would have encoded the sig_coeff_flag for the first coefficient, then the sig_coeff_flag for the second coefficient, followed by the par_level_flag for the first coefficient, then the par_level_flag for the second coefficient, and so forth.

Interleaved coefficient coding (e.g., encoding plurality of the coefficient information on a coefficient-by-coefficient basis) rather than encoding the coefficient information on a bitplane-by-bitplane basis may be beneficial such as in transform-skip mode. For example, when coding coefficient information, context-based coding may be preferred. However, there may be a limit to how many bins can be context-based coded (e.g., referred to as a coded bin count limit). One example of the coded bin count limit is 2*block width of the current block*block height of the current block. Another example of the coded bin count limit is 1.75*block width of the current block*block height of the current block. In some cases, the video encoder may need to determine on a coefficient-by-coefficient basis how many bins are going to be used and how many bins are going to be available after coding the coefficient information for a coefficient. How many bins are going to be used and how many bins are going to be available after coding the coefficient information for a coefficient may be needed for determining quantization parameters, such as in the rate distortion optimization quantization (RDOQ) process.

By interleaving the coefficient information that uses context-based coding (e.g., significance information, sign information, parity information, and greater than flags) on a coefficient-by-coefficient basis, the video encoder may be able to better track how many bins are going to be used for a coefficient than in examples where the coefficient information that uses context-based coding is coded in bitplane-by-bitplane basis. For instance, in a bitplane-by-bitplane basis, the video encoder does not know how many bins are needed for one coefficient until the video encoder passes through all coefficients.

In one or more examples described in this disclosure, after the first pass of coefficient information that is context-based coded, the remainder information is coded. The remainder information may not be context-based coded (e.g., bypass coded). Because the remainder information is bypass coded, the remainder information may not impact the number of bins needed for context-based coding, and therefore, can be separated out from the context-based coding of context information such as significance information, sign information, parity information, and level values.

Accordingly, in one or more examples, the example techniques described in this disclosure may improve the coefficient coding process. The one or more techniques described in this disclosure provide for a practical application to coding coefficient information that may improve the overall video coding process for instance by separating out coefficient information that needs context-based coding from coefficient information that can be bypass coded.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices. Accordingly, source device 102 and destination device 116 may be one or more of a camera, a computer, a mobile device, a broadcast receiver device, or a set-top box.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coefficient coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for coefficient coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14 Meeting: Geneva, CH, 19-27 Mar. 2019, JVET-N1001-v7 (hereinafter "VVC Draft 5"). A recent draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: by teleconference, 15-24 Apr. 2020, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block of the current block being encoded, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

Transforming the residual block to produce transformed data in the transform domain instead of the sample domain is not necessary in all examples. In some examples, transform may be skipped (e.g., in transform-skip mode for the current block). In such examples, video encoder 200 may perform further operations on the residual values (e.g., residual data) of the residual block. For example, the transform data (e.g., where transformation from sample domain to transform domain occurs) may result in transform coefficients, and video encoder may perform operations on the transform coefficients.

When transform is skipped, video encoder 200 may perform operations on the residual values. For example, in examples where transform is skipped, the coefficients may correspond to the residual data (e.g., difference between samples of current block and prediction block). For example, where transform is skipped a value for a first coefficient may be the first residual value in the residual block, a value for a second coefficient may be the second residual value in the residual block, and so on. In the following description, where transform coefficients are described, rather than using transform coefficients, the techniques may utilize coefficient values where transform is skipped. In other words, the example techniques described for transform coefficients may also be applied to coefficient values where transform is skipped.

As noted above, following any transforms to produce transform coefficients or where transform is skipped, video encoder 200 may perform quantization of the coefficients. Quantization generally refers to a process in which coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

In one or more examples, video encoder 200 may skip quantization. For instance, in some examples, where transform skip is enabled, it may be possible for video encoder 200 to skip quantization. In the below description, although quantization is described as occurring, it should be understood that in some examples, quantization may be also be skipped.

Following quantization, video encoder 200 may scan the coefficients, producing a one-dimensional vector from the two-dimensional matrix including the quantized coefficients. The scan may be designed to place higher energy (and therefore lower frequency) coefficients at the front of the vector and to place lower energy (and therefore higher frequency) coefficients at the back of the vector. However, in examples where transform is skipped, the scan may not place higher energy coefficients at the front of the vector and place lower energy coefficients at the back of the vector.

In some examples, video encoder 200 may utilize a predefined scan order to scan the coefficients to produce a serialized vector, and then encode the coefficients of the vector. In other examples, video encoder 200 may perform an adaptive scan. After scanning the coefficients to form the one-dimensional vector, video encoder 200 may encode the one-dimensional vector, e.g., according to context-adaptive binary arithmetic coding (CABAC) (e.g., context-based coding) and/or bypass coding (e.g., not context-based coding). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients (or quantized coefficients where transform is skipped or coefficients where transform and quantization is skipped). For ease of description, in this disclosure, the term coefficient may include examples where quantization is skipped, transform is skipped, quantization and transform are skipped, quantization is skipped but transform is performed, or quantization is performed but transform is skipped. In one or more examples, in the techniques described in this disclosure, the examples may be performed with coefficients where transform is skipped but quantization may or may not be skipped.

Video decoder 300 may inverse quantize (if needed) and inverse transform (if needed) the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine (e.g., add) the prediction block and the residual block (on a sample-by-sample basis) to reproduce (e.g., reconstruct) the original block. Video decoder 300 may perform additional processing, such as performing a deblocking process to reduce visual artifacts along boundaries of the block.

In accordance with the techniques of this disclosure, a video coder (e.g., video encoder 200 or video decoder 300) may be configured to perform operations in examples where transform skip is enabled and code (e.g., encode or decode)

coefficient values. For example, a video coder may determine that transform skip is enabled and code a coefficient value for a coefficient in a residual block based on one or more coefficient values of one or more neighboring coefficients. In some examples, the video coder may code, in an interleaving manner, one or more syntax elements on a coefficient-by-coefficient basis for coefficients in a residual block in a first pass and after the first pass, coding a syntax element on the coefficient-by-coefficient basis for coefficients in the residual block in a second pass.

In one or more examples, the video coder may code, in an interleaving manner, coefficient information on a coefficient-by-coefficient basis for coefficients in a residual block of a current block in a first pass. The coefficient information for a coefficient includes a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values.

Table 1 below illustrates an example of coefficient values and the respective flags that are signaled for each of the coefficients. The boxes labeled as NA are for the flags that are not signaled for corresponding coefficient values. In table 1, Rem stands for the remainder, and is not signaled as a flag, but as a value. Also, in table 1, the values are positive, which is why the sign value is 0.

300 may parse, in the first pass, a significance flag indicating whether a value of the coefficient is not zero, a parity flag indicating whether the value of the coefficient is odd or even, a sign flag indicating whether the value of the coefficient is positive or negative, and one or more greater than flags. Video decoder 300 may parse this example coefficient information for one coefficient, then parse this example coefficient information for the next coefficient, and so forth for parsing, in an interleaving manner, the coefficient information on the coefficient-by-coefficient basis for coefficients in a residual block for a current in a first pass. After the first pass, to code remainder information, video decoder 300 may parse remainder information for coefficients in the residual block of the current block in the second pass.

Not all of the example coefficient information may be signaled and parsed in all examples. For example, if the coefficient value is 0, then video encoder 200 may signal and video decoder 300 may parse the significance flag as 0 (e.g., indicating that value of the coefficient is zero). In this example, video encoder 200 may not signal and video decoder 300 may not receive parity or sign information or any of the greater than flags. As another example, if the coefficient value is 1.8, then video encoder 200 may signal and video decoder 300 may parse the significance flag, the parity flag, the sign flag, and the greater than 1 flag, but video encoder 200 may not signal and video decoder 300 may not parse any of the other greater than flags.

TABLE 1

| Coeff | 0 | 1 | 2 | 3 | 4 | 5 | 6 | 7 | 8 | 9 | 10 | 11 | 12 |
|---|---|---|---|---|---|---|---|---|---|---|---|---|---|
| Sig  | 0  | 1  | 1  | 1  | 1  | 1  | 1  | 1  | 1  | 1  | 1 | 1 | 1 |
| Sign | NA | 0  | 0  | 0  | 0  | 0  | 0  | 0  | 0  | 0  | 0 | 0 | 0 |
| Gt1  | NA | 0  | 1  | 1  | 1  | 1  | 1  | 1  | 1  | 1  | 1 | 1 | 1 |
| Par  | NA | NA | 0  | 1  | 0  | 1  | 0  | 1  | 0  | 1  | 0 | 1 | 0 |
| Gt2  | NA | NA | 0  | 0  | 1  | 1  | 1  | 1  | 1  | 1  | 1 | 1 | 1 |
| Gt3  | NA | NA | NA | NA | 0  | 0  | 1  | 1  | 1  | 1  | 1 | 1 | 1 |
| Gt4  | NA | NA | NA | NA | NA | NA | 0  | 0  | 1  | 1  | 1 | 1 | 1 |
| Gt5  | NA | NA | NA | NA | NA | NA | NA | NA | 0  | 0  | 1 | 1 | 1 |
| Rem  | NA | NA | NA | NA | NA | NA | NA | NA | NA | NA | 0 | 0 | 1 |

To code, in an interleaving manner, the coefficient information (e.g., a significance flag indicating whether a value of the coefficient is not zero, a parity flag indicating whether the value of the coefficient is odd or even, a sign flag indicating whether the value of the coefficient is positive or negative, and one or more greater than flags), video encoder 200 may signal such coefficient information for a first coefficient. Then, video encoder 200 may signal such coefficient information for a second coefficient, and so forth. In contrast, in a bitplane-by-bitplane (e.g., not interleaved manner), video encoder 200 may signal the significance flag for each coefficient in the residual block of the current block, then signal the parity flag for each coefficient in the residual block of the current block, and so forth.

However, in one or more examples described in this disclosure, video encoder 200 may signal, in an interleaving manner, the coefficient information, in a first pass. After the first pass, the video coder may code remainder information for coefficients in the residual block of the current block in a second pass (e.g., on the coefficient-by-coefficient basis, but not limited to coefficient-by-coefficient basis).

To code, in the interleaving manner, video decoder 300 may parse the coefficient information on a coefficient-by-coefficient basis for coefficients in the residual block of the current block in the first pass. For example, video decoder There may be benefits in coding, in an interleaving manner, the coefficient information in the first pass and coding remainder information in a second pass. In some cases, the coefficient information that is coded in interleaving manner may be coded using context-based coding and the remainder information may be coded using bypass coding. Context-based coding refers to examples where contexts are used to determine a probability that a bin will be a 0 or 1, and using the probabilities to encode or decode values. Example of context-based coding includes CABAC. Bypass coding refers to examples where contexts are not used to determine a probability (or the probability is assumed to be 0.5).

In context-based coding, there may be a coded bin count limit that sets a maximum number of bins in a residual block that can be context-based coded. One example of the coded bin count limit is 2*block width of the current block*block height of the current block or 1.75*block width of the current block*block height of the current block. However, there may be other examples of the coded bin count limit.

For rate distortion optimization quantization (RDOQ), video encoder 200 may need to determine how many bins for a current coefficient are to be context-based coded and how many bins are going to be left after the current coefficient (e.g., a running total of bins used for context-based coding minus the coded bin count limit). For RDOQ, video encoder 200 may determine, on a coefficient-by-coefficient basis, how many bins for a current coefficient are to be context-based coded and how many bins are going to be left after the current coefficient. With coding, in the interleaving manner, video encoder 200 may be able to determine for a current coefficient how many bins the current coefficient will use for context-based coding before video encoder 200 begins to determine how many bins the next coefficient will use for context-based coding. With bitplane-by-bitplane processing, video encoder 200 may not be able to determine how many bins a current coefficient will use until video encoder 200 processes all coefficients, which can negatively impact how quickly video encoder 200 can encode and signal information needed to reconstruct the current block.

In one or more examples, examples of coefficient information that is context-based coded include a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values (e.g., abs_level_gtx_flag[n][j] specifies whether the absolute value of a coefficient level is greater than (J<<1)+1). The remainder information may be coded in bypass mode. Therefore, the remainder information can be coded in a second pass after the first pass that includes the coefficient information that is context-based coded because the coding of the remainder information does not impact whether the coded bin count limit is reached or not (e.g., because reminder information is bypass coded).

As described above, there may be a context bin count limit. Accordingly, in some examples, to code, in the interleaving manner, the video coder may context-based code, in the interleaving manner, coefficient information on the coefficient-by-coefficient basis until the coded bin count limit is reached, and bypass code, in the interleaving manner, coefficient information on the coefficient-by-coefficient basis after the coded bin count limit is reached. For example, if during coding of a coefficient, video encoder 200 and video decoder 300 reaches the coded bin count limit after coding the significance flag, then video encoder 200 and video decoder 300 may bypass code the remaining coefficient information for the coefficient and for subsequent coefficients.

Also, to code remainder information, the video coder may be configured to coding information indicative of a remaining absolute value of a coefficient. However, in some examples, if the video coder reaches the coded bin count limit during the coding of the particular coefficient, the video coder may code respective values of coefficients following the particular coefficient, as part of the second pass. For example, rather than coding greater than flags for coefficients following the particular flag, the video coder may code remainder information for the coefficients following the particular flag, where the remainder information is the actual value of the coefficient or the absolute value of the coefficient minus 1.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
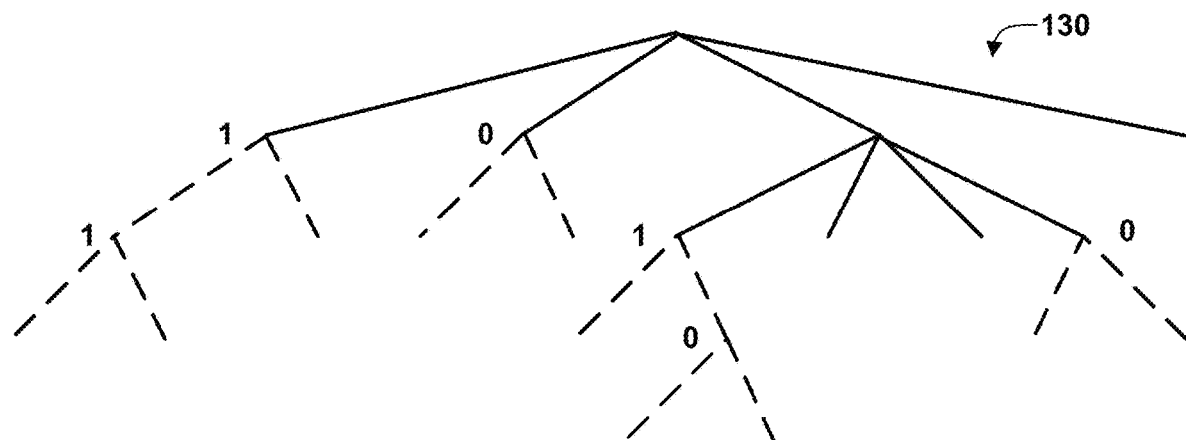
FIGS. 2A and 2B are conceptual diagrams illustrating an example quadtree binary tree (QTBT) structure, and a corresponding coding tree unit (CTU).
Figure 2B:
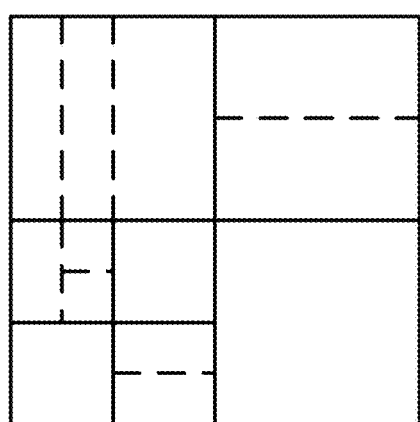

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

As described above, the example techniques described in this disclosure relate to coefficient coding for transform skip mode. For example, this disclosure describes examples of coefficient coding methods targeting at coding of transform skip mode. For instance, this disclosure is related to an entropy decoding process that converts a binary representation to a series of non-binary valued quantized coefficients. The corresponding entropy encoding process, which is the reverse process of entropy decoding, is part of this disclosure as well. For instance, the entropy encoding process may be performed as the reverse of the decoding process. The techniques described in this disclosure may be applied to any of the existing video codecs, such as High Efficiency Video Coding (HEVC), or be a coding tool in standards currently being developed, such as Versatile Video Coding (VVC), and applied to other future video coding standards.

The following describes correlation between transform skip (TS) coefficients. In transform-skip mode, transform process is skipped for residual signals before quantization step on the encoder side (e.g., video encoder 200) and inverse transform step after the dequantization step on the decoder side (e.g., video decoder 300). The characteristics of a not transformed residual signal are quite different than the characteristics of transformed signals.

The coefficients are more correlated with their neighboring coefficients in the transform skip case. As a result, the level values of neighboring coefficients (e.g., actual value of the coefficient) as well as the sign information of neighboring coefficients are more correlated. Coding of the levels (e.g., greater than flags) and the sign information in the transform skip (TS) coefficient coding was proposed in B. Bross, T. Nguyen, P. Keydel, H. Schwarz, D. Marpe, T. Wiegand, "Non-CE8: Unified Transform Type Signalling and Residual Coding for Transform Skip", JVET document JVET-M0464, Marrackech, MA, January 2019 (herein JVET-M0464). This disclosure describes examples of exploiting the signal characteristics for more efficient coding.

The following describes coding of transform skip (TS) coefficients. In some techniques, transform skip residual coding, sig_coeff_flag, coeff_sign_flag, abs_level_gt1_flag, par_level_flag syntax elements are coded interleaved coefficient by coefficient in the first pass. Starting from second pass, abs_level_gtX_flags, (currently up to 5, and corresponding passes), syntax elements are coded bitplane-by-bitplane fashion. The following is one example of definitions of the syntax elements.

sig_coeff_flag[xC][yC] specifies for the transform coefficient location (xC, yC) within the current transform block whether the corresponding transform coefficient level at the location (xC, yC) is non-zero.

abs_level_gtX_flag[n] specifies whether the absolute value of the transform coefficient level (at scanning position n) is greater than X. Examples of abs_level_gtX_flag includes abs_level_gt1_flag, abs_level_gt2_flag, and so on. Another example of abs_level_gtX_flag is: abs_level_tx_flag[n][j] specifies whether the absolute value of the transform coefficient level (at scanning position n) is greater than (j<<1)+1. When abs_level_gtx_flag[n][j] is not present, it is inferred to be equal to 0.

par_level_flag[n] specifies the parity of the transform coefficient level (e.g., odd or even) at scanning position n.

coeff_sign_flag[n] specifies the sign of a transform coefficient level for the scanning position n.

In all passes, the syntax elements are coded as regular coded bins if the number of regular coded bin count limit is not reached. If during the encoding of the passes, the regular coded bin count is reached, the rest of the syntax element are bypass coded. In the last pass, abs_remainder parts of coefficients are coded using Rice codes. Rice codes are one example of bypass coding (e.g., where context-based coding is not used). One example definition of abs_remainder is abs_remainder[n] is the remaining absolute value of a transform coefficient level that is coded with Golomb-Rice code at the scanning position n. There is an upper limit for the number of regular coded bins that can be used in a TS block (e.g., a current block coded in transform-skip mode).

In one example, the disclosure describes level-mapping based coefficient coding. In transform skip residual coding of JVET-M0464, coefficient absolute levels absCoeffLevel are coded using sig_coeff_flag, abs_level_gtX_flags, par_level_flag, and abs_remainder value to form the final absolute transform coefficient value, where X can be 1, . . . ,5 (or some other cut off value C). In this example, the absCoeffLevel value may be constructed by: absCoeffLevel=1+abs_level_gt1_flag+par_level_flag+2*(abs_level_gt2_flag+abs_level_gt3_flag+ . . . +abs_level_gtC_flag)+2*abs_remainder.

In one or more examples described in this disclosure, instead of or in addition to representing the absCoeffLevel directly as in JVET-M0464, the absCoeffLevel is mapped to a modified level to be coded as described below on the encoder side (e.g., video encoder 200) and inverse mapped on the decoder side (e.g., video decoder 300) as described below.

The absCoeffLevel information of left and above coefficients are used to perform the mapping. In this case, let $X_0$ denote the absolute coefficient level to the left of the current coefficient, and let $X_1$ denote the absolute coefficient level of above coefficient. For representing a coefficient with absolute coefficient level absCoeff, a mapped absCoeffMod is coded which is derived as follows:

For Video Encoder 200:

```
pred = min(X0, X1) == 0 ? max(X0, X1) : min(X0, X1);
if (absCoeff == pred)
{
    absCoeffMod = 1;
}
else
{
    absCoeffMod = (absCoeff < pred) ? absCoeff + 1 : absCoeff;
}
```

In the above pseudo-code, if min(X0,X1)==0, then max (X0, X1) is used as the pred; otherwise min(X0,X1) is used as the pred. If the absolute value of coefficient to be coded is equal to the predictor pred, then the modified level absCoeffMod is set to 1; otherwise if the absolute value of coefficient is less than the predictor, then the value to be coded is incremented by 1; otherwise the absCoeff value is not modified.

For Video Decoder 300:

```
pred = min(X0, X1) == 0 ? max(X0, X1) : min(X0, X1);
if (absCoeffMod == 1 && pred > 0)
{
    absCoeff = pred;
}
else
{
    absCoeff = absCoeffMod − (absCoeffMod <= pred);
}
```

The following describes examples of interleaved coefficient coding. In some examples, video encoder 200 and/or video decoder 300 may convert all the coding of syntax elements up to coding of abs_remainder in an interleaved fashion instead of separating them into several bitplanes. The TS residual coding is changed such that the sig_coeff_flag, par_level_flag, coeff_sign_flag and all the abs_level_gtX_flags are coded in an interleaved way coefficient by coefficient in the first pass. After the first pass, abs_remainder is coded coefficient by coefficient. In some examples, when the regular coded bin count limit is reached, the rest of the syntax elements are coded in bypass mode.

For example, a video coder (e.g., video encoder 200 and video decoder 300) may code, in an interleaving manner, coefficient information on a coefficient-by-coefficient basis for coefficients in a residual block of a current block in a first pass. The coefficient information for a coefficient includes a significance flag indicating whether a value of the coefficient is not zero (e.g., sig_coeff_flag), a parity flag indicating whether the value of the coefficient is odd or even (e.g., par_level_flag), a sign flag indicating whether the value of the coefficient is positive or negative (e.g., coeff_sign_flag), and one or more greater than flags (e.g., the abs_level_gtX_flags). The video coder may, after the first pass, code remainder information (e.g., abs_reminader) for coefficients in the residual block of the current block in a second pass.

In some examples, to code, in the interleaving manner, the coefficient information, the video coder may context-based code, in the interleaving manner, coefficient information on the coefficient-by-coefficient basis until a coded bin count limit is reached. The video coder may bypass code, in the interleaving manner, coefficient information on the coefficient-by-coefficient basis after the coded bin count limit is reached.

Figure 3:
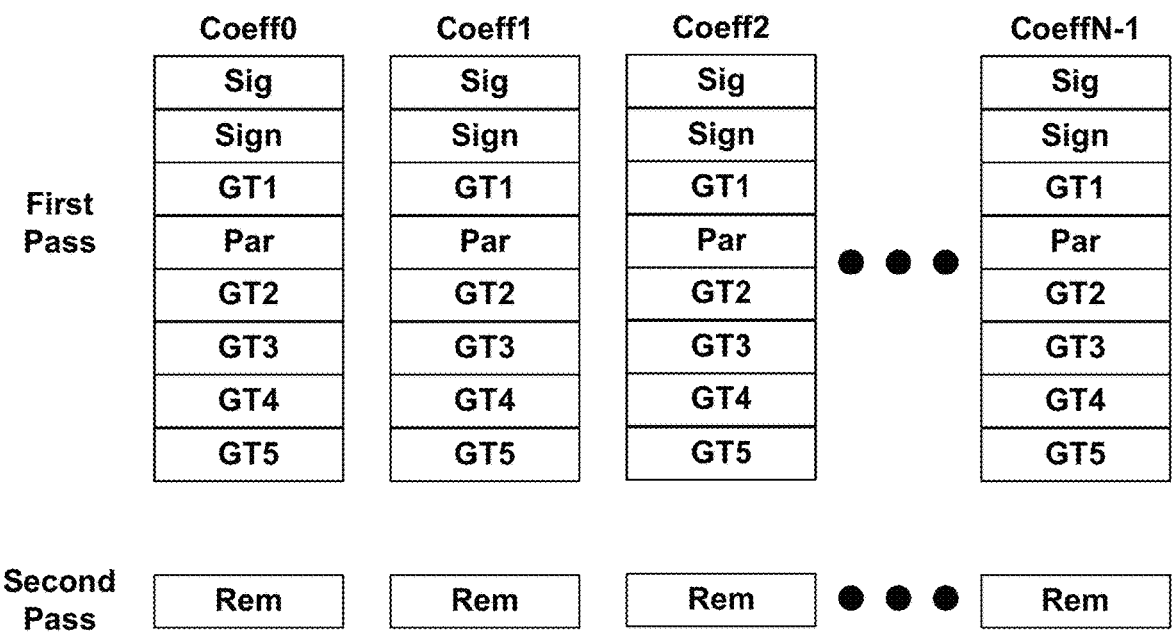
FIG. 3 is a conceptual diagram illustrating an example of coding coefficient information for coefficients.

FIG. 3 is a conceptual diagram illustrating an example of coding coefficient information for coefficients. FIG. 3 illustrates coefficient 0 to coefficient N−1. In this example, in a first pass, a video coder may code the significance flag, sign flag, gt1 flag, parity flag, and then gt2-gt5 flags for coefficient 0 to coefficient N−1, in an interleaving manner. The gt1-gt5 flags are short for abs_level_gtX_flags, where X equals 1, 2, 3, 4, or 5. The gt1-gt5 or the abs_level_gtX_flags may be referred to as "greater than" flags as well.

In the first pass through the coefficients, the video coder may code the significance flag, sign flag, gt1 flag, parity flag, and gt2-gt5 flags for coefficient 0, then, still in the first pass through the coefficients, the video coder may code the significance flag, sign flag, gt1 flag, parity flag, and gt2-gt5 flags for coefficient 1, and so forth. For example, video encoder 200 may signal and video decoder 300 may parse, in a first pass through the coefficients, the significance flag, sign flag, gt1 flag, parity flag, and gt2-gt5 flags for coefficient 0, followed by the significance flag, sign flag, gt1 flag, parity flag, and gt2-gt5 flags for coefficient 1, as part of the first pass through the coefficients, through to coefficient N−1.

After the first pass, the video coder may code the remainder information for coefficient 0 to coefficient N−1. For example, video encoder 200 may signal and video decoder 300 may parse the remainder information for coefficient 0 to coefficient N−1 in the second pass. In the example illustrated in FIG. 3, video encoder 200 and video decoder 300 may not have reached the coded bin count limit when context-based coding the coefficient information in the first pass.

Figure 4:
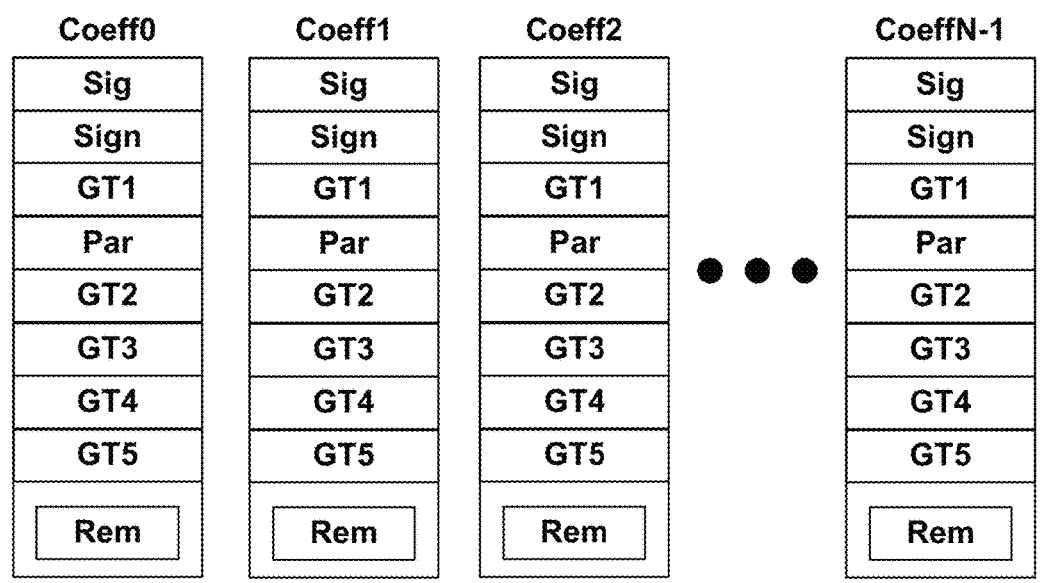
FIG. 4 is a conceptual diagram illustrating another example of coding coefficient information for coefficients.

FIG. 4 is a conceptual diagram illustrating another example of coding coefficient information for coefficients. In the example of FIG. 4, the video coder may code all components of a coefficient (including the remainder) in an interleaved manner. For example, rather than coding coefficient information like a significance flag indicating whether a value of the coefficient is not zero (e.g., sig_coeff_flag), a parity flag indicating whether the value of the coefficient is odd or even (e.g., par_level_flag), a sign flag indicating whether the value of the coefficient is positive or negative (e.g., coeff_sign_flag), and one or more greater than flags (e.g., the abs_level_gtX_flags) in a first pass, and remainder information in a second pass, the video coder may code the coefficient information and the remainder information in one pass, i.e., in the same pass.

For example, as shown in FIG. 4, each coefficient may be split into sig_coeff_flag, coeff_sign_flag, abs_level_gt1_flag, par_level_flag, abs_level_gtX_flags (X=2, 3, 4, 5) and abs_remainder. All the syntax elements for one coefficient are coded before coding the next coefficient.

FIG. 5 is a conceptual diagram illustrating another example of coding coefficient information for coefficients. In the example of FIG. 5, the coding of sig_coeff_flag, coeff_sign_flag, abs_level_gt1_flag, par_level_flag, abs_level_gtX_flags is split into two passes. In the first pass, sig_coeff_flag, coeff_sign_flag, abs_level_gt1_flag are coded. In the second pass, abs_level_gtX_flags and par_level_flag are coded. The par_level_flag may be after all the abs_level_gtX_flags, and part of the second pass. In the third pass, the video coder may code the remainder information, as shown in FIG. 5.

FIG. 6 is a conceptual diagram illustrating another example of coding coefficient information for coefficients. In the example of FIG. 6, the syntax sig_coeff_flag, coeff_sign_flag, abs_level_gt1_flag, and abs_level_gt2_flag for all the coefficients in the coefficient group (e.g., residual block) are coded interleaved in the first pass. In the second pass, coefficient information: abs_level_gtX_flags (X=3, 4, 5) and par_level_flag are coded. In the second pass, the video coder may code par_level_flag after all the abs_level_gtX_flags. In the last pass (e.g., third pass), the video coder may code remainder information (e.g., abs_remainder) for all of the coefficients in the coefficient group.

This disclosure also describes examples of handling the bypass coding after the context bin limit (e.g., coded bin count limit) is reached. As one example, the coded bin count limit is 2*block width*block height. As another example, the coded bin count limit is 1.75*block width*block height. In some techniques, if the coded bin count limit is reached, video encoder 200 may separate the absolute value of a coefficient into abs_level_gt1_flag, par_level_flag, abs_level_gtX_flags(X=2, 3, 4, 5) and abs_remainder, and bypass code each of these coefficient information. However, in accordance with one or more examples described in this disclosure, rather than bypass code each one of abs_level_gt1_flag, par_level_flag, abs_level_gtX_flags (X=2, 3, 4, 5) and abs_remainder, video encoder 200 may encode respective values of the coefficients following a particular coefficient, where during or at completion of coding the particular coefficient, the coded bin count limit is reached. As one example, video encoder 200 may bypass encode the absolute value abs(coefficient value)−1 directly, rather than bypass code each one of abs_level_gt1_flag, par_level_flag, abs_level_gtX_flags(X=2, 3, 4, 5) and abs_remainder. Video decoder 300 may bypass decode the coefficient value (e.g., based on the bypass encoding of the coefficient value or the abs (coefficient value)−1)) for a coefficient following a particular coefficient for which the coded bin count limit is reached. For example, video encoder 200 and video decoder 300 may utilize Rice-Golomb coding of the abs_remainder to encode and decode the absolute value of coefficients after the coded bin count limit is reached, and after sig_coeff_flag and coeff_sign_flag are bypass coded.

Rice-Golomb coding is a scheme of binarization to convert a value to a series bins of 1 or 0. In some examples, it may be possible to use context based coding when Rice-Golomb coding is used. However, for the remainder, Rice-Golomb coding is used and the bins are bypass coded.

If the regular bin count (e.g., coded bin count limit) is reached before coding of gt1 flag, all remaining significance and sign flags are bypass coded and for significant coefficients after reaching the coded bin count limit, the remainder is coded as an absolute value of the coefficient or the absolute value of the coefficient−1 without splitting the coefficient into gt1, par, gt2, . . . , gt5 and corresponding remainder. Accordingly, in this example, for a coefficient at and after reaching the coded bin count limit (e.g., coefficients following a particular coefficient, where the coded bin count limit is reached during the coding of the particular coefficient), video encoder 200 and video decoder 300 may bypass code the significance and sign flags, and bypass code the remainder portion without utilizing gtX and parity flags. Example techniques of bypass coding include Rice-Golomb coding.

If the coded bin count limit is reached after coding of gt1 flag for a coefficient, then video encoder 200 and video decoder 300 may bypass code the remaining gtX and parity flags for that coefficient before switching to the coding of significance and sign flags as bypass and the remainder as Rice-Golomb code. The example techniques may be applied to various schemes changing the coding order of significance, sign, gt1, par, gtX flags where once the regular bin count (e.g., coded bin count limit) is reached, for the rest (and including the current) of the coefficients, only significance and sign flags are bypass coded and the remaining portion of the coefficient is represented by one Rice-Golomb coded value. Rice-Golomb coding is one example, and other types of binarization with bypass coding techniques may be used as well, such as unary coding. In this disclosure, the remainder information may refer to a remaining value after coding of the greater than flags.

In some examples, the parameter of Rice-Golomb coding may be redesigned because when encoding or decoding the whole abs(coeff)−1 instead of the remainder of the abs (coeff), larger values are expected to be coded. One example of changes to Rice-Golomb design may be as follows:

Let posX, posY be the position of the current coefficient, and LeftCoeff be the left neighbor of the current coefficient, and AboveCoeff be the above neighbor of the current coefficient.

```
Let sum = 0
if (posX > 0)
{
    sum += abs(LeftCoeff);
}
if (posY > 0)
{
    sum += abs(AboveCoeff);
}
``` const uint32_t auiGoRicePars[32]={1, 0, 1, 1, 1, 1, 1, 2, 2, 22, 2, 2, 2, 2, 2, 2, 2, 3, 3, 3, 3, 3, 3, 3, 3, 3, 3, 3, 3, 3, 3, 3};

Use auiGoRicePars[min(sum, 31)] as the Rice-Golomb parameter.

Another example of deriving the Rice-Golomb parameter for encoding abs(coeff)−1 uses a different table as auiGoRicePars: const uint32_t auiGoRicePars[32]={1, 1, 1, 1, 1, 1, 1, 2, 2, 2, 2, 2, 2, 2, 2, 2, 2, 3, 3, 3, 3, 3, 3, 3, 3, 3, 3, 3, 3, 3, 3, 3}.

Figure 7:
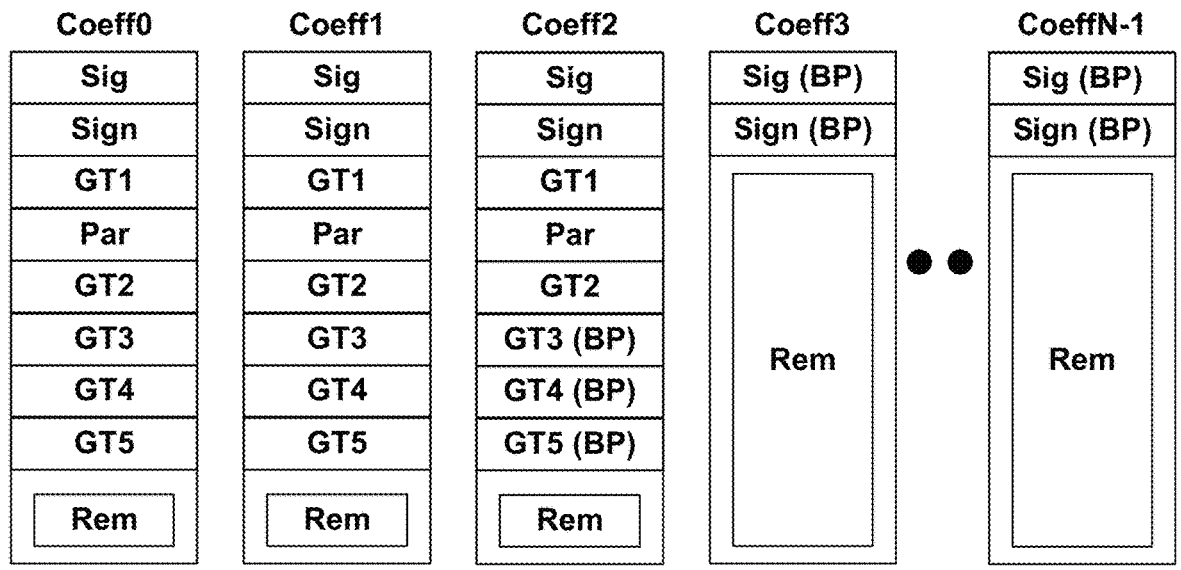
FIG. 7 is a conceptual diagram illustrating another example of coding coefficient information for coefficients.

The example techniques described in this disclosure may be combined together. For example, FIG. 7 is a conceptual diagram illustrating another example of coding coefficient information for coefficients. In the example of FIG. 7, video encoder 200 and video decoder 300 may perform techniques similar to the combination of the example of FIG. 4 and the example where the coefficient value or coefficient value−1 is directly bypass coded.

For instance, in the example illustrated in FIG. 7, all the components of each coefficient are coded in an interleaved manner, and if regular coded bins are used up (e.g., coded bin count limit is reached) when coding one of the coefficients (e.g., Coeff 2 in FIG. 7), then starting from the next coefficient, after encoding or decoding the sig flag (e.g., significance flag) and the sign flag, the remainder information (e.g., abs(coeff)−1) may not be split before being coded. In other words, for coefficients following Coeff2 (e.g., Coeff3 to CoeffN−1), video encoder 200 and video decoder 300 may, in an interleaving manner, bypass encode or decode the significance flag (e.g., sig_coeff_flag) and sign flag (e.g., coeff_sign_flag) for each coefficient, and for each coefficient, video encoder 200 and video decoder 300 may bypass code the remainder information.

Figure 8:
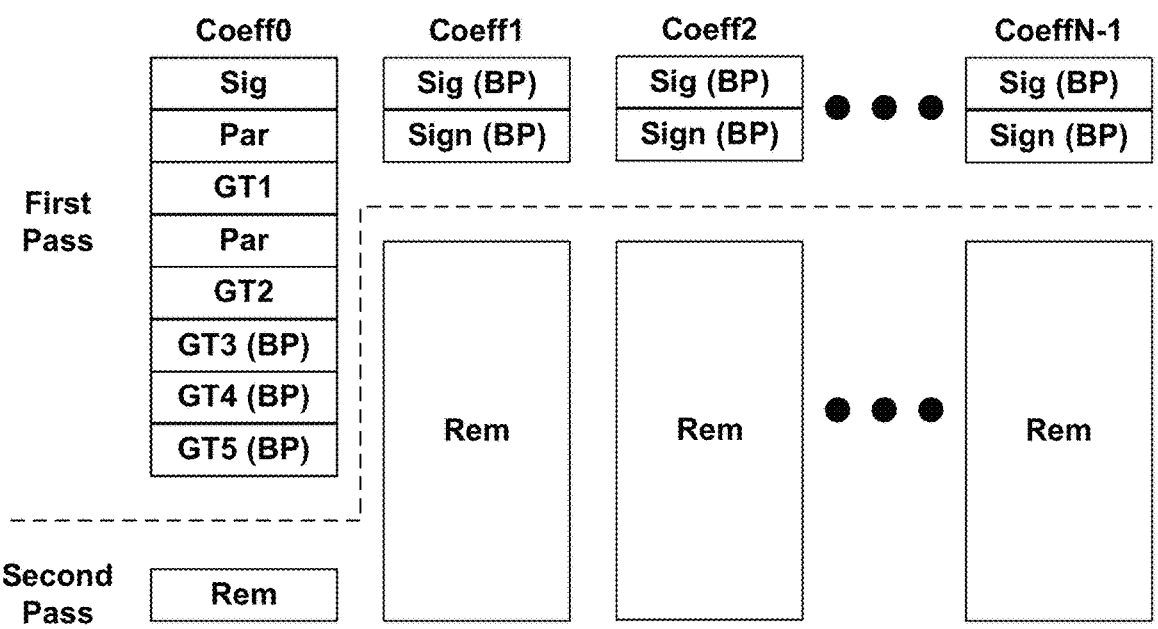
FIG. 8 is a conceptual diagram illustrating another example of coding coefficient information for coefficients.

FIG. 8 is a conceptual diagram illustrating another example of coding coefficient information for coefficients. In the example of FIG. 8, video encoder 200 and video decoder 300 may perform techniques similar to the combination of the example of FIG. 3 and the example where the coefficient value or coefficient value−1 is directly bypass coded.

For instance, similar to the example of FIG. 3, video encoder 200 and video decoder 300 may encode or decode the coefficients in a two-pass manner. For example, before the coded bin count limit is reached, video encoder 200 and video decoder 300 may encode and decode, in an interleaving manner, coefficient information on a coefficient-by-coefficient basis for coefficients in a residual block for a current block in a first pass, where the coefficient information for a coefficient includes a significance flag (e.g., sig_coeff_flag) indicating whether a value of the coefficient is not zero, a parity flag (e.g., par_level_flag) indicating whether the value of the coefficient is odd or even, a sign flag (e.g., coeff_sign_flag) indicating whether the value of the coefficient is positive or negative, and one or more greater than flags (e.g., abs_level_gtX_flags). After the first pass, video encoder 200 and video decoder 300 may encode and decode remainder information (e.g., abs_remainder) for coefficients in the residual block in a second pass.

After a context bin limit is reached, for a particular coefficient, if none of the abs_level__gt1_flag, abs_level_gtX_flags, par_level_flag can be coded for the particular coefficient using context (e.g., due to the coded count bin limit being reached), then video encoder 200 and video decoder 300 may not split the absolute value of that coefficient into abs_level_gt1_flag, abs_level_gtX_flags, par_level_flag and abs_remainder. Instead, video encoder 200 and video decoder 300 may encode or decode respective values of coefficients following the particular coefficient (e.g., encode or decode abs(coefficient value)−1)) as part of the second pass (e.g., as Rice-Golomb coding).

For instance, as illustrated in FIG. 8, when coding the Coeff 0 of the current coding group, video encoder 200 and video decoder 300 may reach the coded bin count limit, such as when coding GT2 (the first abs_level_gtX_flag (X=2, 3, 4, 5)). Because the coded bin count limit is reached, video encoder 200 and video decoder 300 may bypass encode the rest of the greater than flags (e.g., greater than 3, greater than 4, and greater than 5), as illustrated in FIG. 8 with (BP), which stands for bypass, next to the GT3 (greater than 3) flag, GT4 (greater than 4) and GT5 (greater than 5) flags. In this example, starting from Coeff 1, video encoder 200 and video decoder 300 may no longer split the absolute values of each coefficient into abs_level_gt1_flag, abs_level_gtX_flags, par_level_flag and abs_remainder. Instead, video encoder 200 and video decoder 300 may bypass code the abs(coefficient)−1 value.

In the example of FIG. 8, to code, in the interleaving manner, coefficient information, video encoder 200 and video decoder 300 may context-based encode and decode, in the interleaving manner, coefficient information on the coefficient-by-coefficient basis until a coded bin count limit is reached. For example, assuming the coded bin count limit is not reached, video encoder 200 and video decoder 300 may have context-based encoded and decoded, on a coefficient-by-coefficient basis a significance flag (e.g., sig_coeff_flag) indicating whether a value of the coefficient is not zero, a parity flag (e.g., par_level_flag) indicating whether the value of the coefficient is odd or even, a sign flag (e.g., coeff_sign_flag) indicating whether the value of the coefficient is positive or negative, and one or more greater than flags (e.g., abs_level_gtX_flags) indicating whether an absolute value of the coefficient is greater than respective threshold values.

However, in the example of FIG. 8, video encoder 200 and video decoder 300 may have reached the coded bin count limit after the greater than 2 flag of Coeff0. In this example, video encoder 200 and video decoder 300 may then bypass encode and decode the remaining flags of Coeff0, and bypass encode and decode the significance flag and the sign flag for coefficients following Coeff0 in the first pass. For example, to code, in the interleaving manner, coefficient information, video encoder 200 and video decoder 300 may context-based code (e.g., encode or decode), in the interleaving manner, coefficient information on the coefficient-by-coefficient basis until a coded bin count limit is reached, and bypass code (e.g., encode or decode), in the interleaving manner, coefficient information on the coefficient-by-coefficient basis after the coded bin count limit is reached.

In the example of FIG. 8, after the first pass, video encoder 200 and video decoder 300 may code remainder information for coefficients in the residual block of the current block in a second pass. For example, to code the remainder information, video encoder 200 and video decoder 300 may code information indicative of a difference between a value of a particular coefficient and a largest threshold value associated with the greater than flags (e.g., such as the remainder information of Coeff0). The coded bin count limit may be reached during the coding of the particular coefficient (e.g., where the particular coefficient is Coeff0 in FIG. 8). Video encoder 200 and video decoder 300 may code respective values of coefficients following the particular coefficient. For example, video encoder 200 and video decoder 300 may code information indicative of a difference between absolute values of respective values of the coefficients following the particular coefficient and 1 (e.g., code information indicative of the value of abs(Coeff1)−1, code information indicative of the value of abs (Coeff2)−1, and so forth until abs(CoeffN−1)−1). In one or more examples, video encoder 200 and video decoder 300 may bypass code the remainder information.

Figure 9:
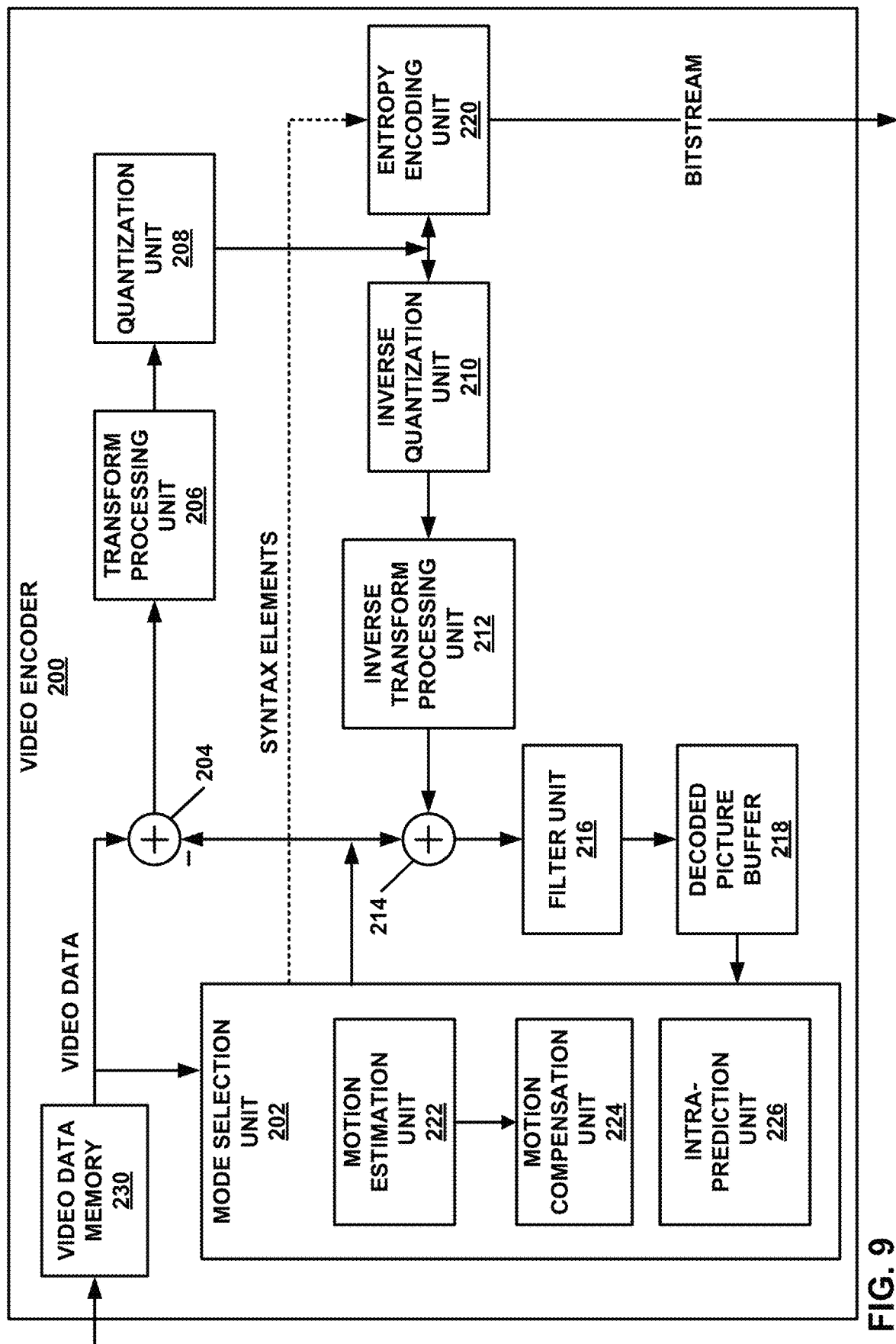
FIG. 9 is a block diagram illustrating an example video encoder that may perform the techniques of this disclosure.

FIG. 9 is a block diagram illustrating an example video encoder 200 that may perform the techniques of this disclosure. FIG. 9 is provided for purposes of explanation and should not be considered limiting of the techniques as broadly exemplified and described in this disclosure. For purposes of explanation, this disclosure describes video encoder 200 in the context of video coding standards such as the H.265 (HEVC) video coding standard and the H.266 (VVC) video coding standard in development. However, the techniques of this disclosure are not limited to these video coding standards, and are applicable generally to video encoding and decoding.

In the example of FIG. 9, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 9 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform.

In some examples, transform processing unit 206 does not apply transforms to a residual block. For example, in examples where mode selection unit 202 determines that transform skip mode is enabled, the operations of transform processing unit 206 may be skipped. In such examples, the values of the coefficients may be for coefficients of the residual block (e.g., first position in the residual block is for a first coefficient and the residual value in the first position is the value for the first coefficient, the second position in the residual block is for a second coefficient and the residual value in the second position is the value for the second coefficient, and so forth).

Quantization unit 208 may quantize the coefficients in a coefficient block (e.g., which may be a transform coefficient block or a residual block), to produce a quantized coefficient block. In some examples, the operations of quantization unit 208 may be skipped. Quantization unit 208 may quantize coefficients of a coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms (if needed) to a quantized coefficient block, respectively, to reconstruct a residual block from the coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine that transform skip is enabled and, based on transform skip being enabled, encode a coefficient value for a coefficient in a residual block based on one or more coefficient values of one or more neighboring coefficients. Video encoder 200 may also be configured to, based on transform skip being enabled, encode in an interleaving manner one or more syntax elements on a coefficient-by-coefficient basis for coefficients in a residual block in a first pass and after the first pass, and encode a syntax element on the coefficient-by-coefficient basis for coefficients in the residual block in a second pass.

As an example, mode selection unit 202 may determine that the current block is coded in transform-skip mode, meaning that the operation of transform processing unit 206 may be skipped. In this example, residual generation unit 204 generates the coefficients that are encoded by entropy encoding unit 220.

Entropy encoding unit 220 may encode, in an interleaving manner (e.g., when transform skip is enabled), coefficient information on a coefficient-by-coefficient basis for coefficients in a residual block of a current block in a first pass. For example, entropy encoding unit 220 may determine the coefficient information for each coefficient in the residual block. The coefficient information for a coefficient includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values.

In this example, to code, in the interleaving manner, the coefficient information, entropy encoding unit 220 may context-based encode (e.g., such as CABAC), in the interleaving manner, coefficient information on the coefficient-by-coefficient basis until a coded bin count limit is reached. For example, entropy encoding unit 220 may determine the coded bin count limit (e.g., 2*block width*block height or 1.75*block width*block height), and track how many of bins of the coded bin count limit are used. When the number of bins reaches (e.g., is greater than or equal to) the coded bin count limit (e.g., after the coded bin count limit is reached), entropy encoding unit 220 may bypass encode, in the interleaving manner, coefficient information on the coefficient-by-coefficient basis.

After the first pass, entropy encoding unit 220 may encode remainder information for coefficients in the residual block of the current block in a second pass. To encode the remainder information, entropy encoding unit 220 may bypass encode the remainder information.

In one or more examples, entropy encoding unit 220 may signal, in the interleaving manner, coefficient information on the coefficient-by-coefficient basis for coefficients in the residual block of the current block in the first pass. Entropy encoding unit 220 may signal remainder information for coefficients in the residual block of the current block in the second pass.

Figure 10:
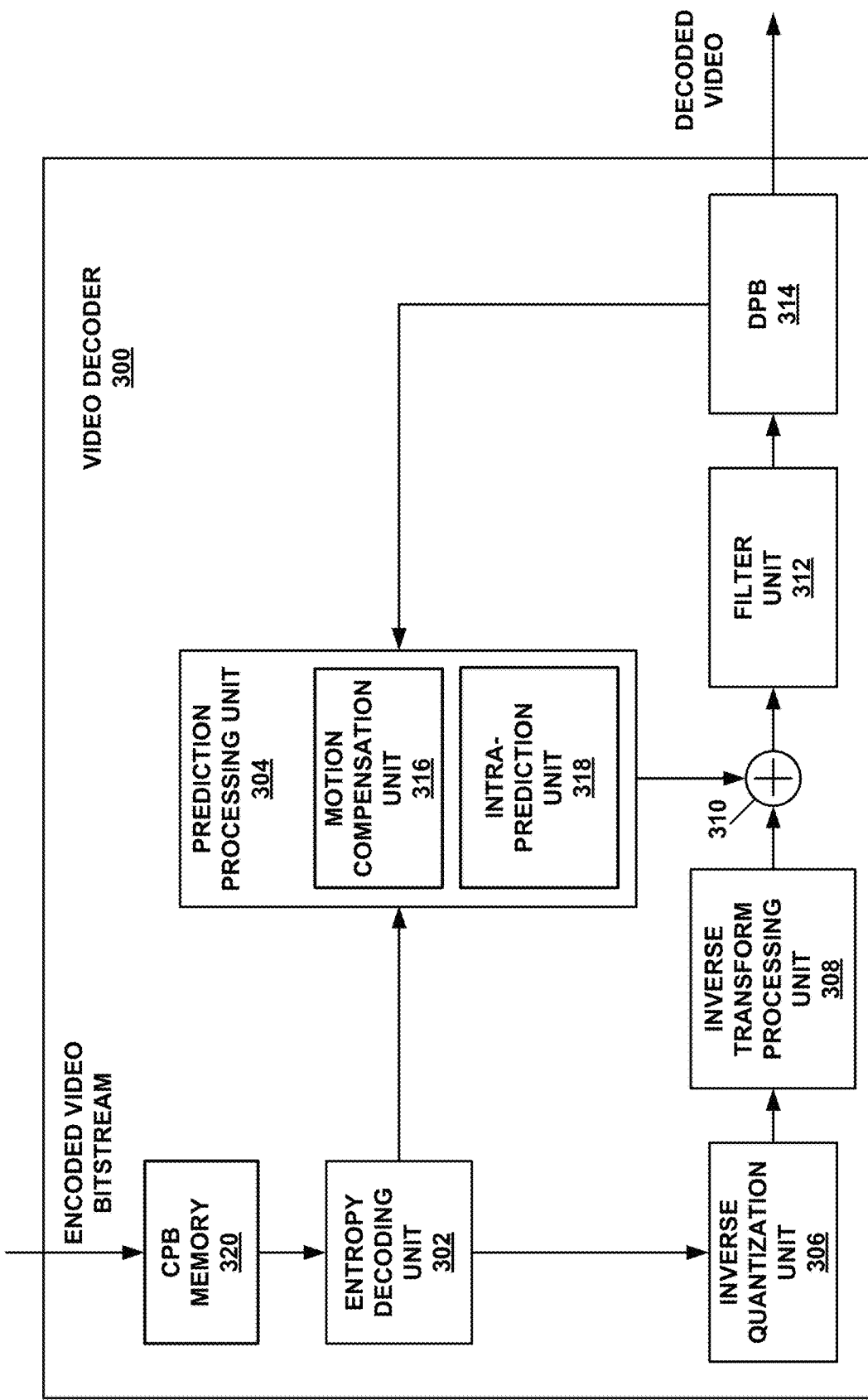
FIG. 10 is a block diagram illustrating an example video decoder that may perform the techniques of this disclosure.

FIG. 10 is a block diagram illustrating an example video decoder 300 that may perform the techniques of this disclosure. FIG. 10 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 10, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 10 are illustrated to assist with understanding the operations performed by video decoder 300. The units may be implemented as fixed-function circuits, programmable circuits, or a combination thereof. Similar to FIG. 9, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a coefficient block including coefficients (e.g., coefficient block where transforms are used or coefficient block where transform is skipped). In some examples, the operations of inverse quantization unit 306 may be skipped. When transform is skipped, the coefficient block may be residual values of a residual block, i.e., such that each coefficient for a position in the residual block is a corresponding residual value for the position.

After inverse quantization unit 306 forms the coefficient block, inverse transform processing unit 308 may apply one or more inverse transforms to the transform coefficient block to generate a residual block associated with the current block. When transform skip mode is enabled, the operations of inverse transform processing unit 308 may be skipped. Inverse transform processing unit 308, if needed, may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 9).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 9). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine that transform skip is enabled and, based on transform skip being enabled, decode a coefficient value for a coefficient in a residual block based on one or more coefficient values of one or more neighboring coefficients. Video decoder 300 may also be configured to decode in an interleaving manner (e.g., when transform skip is enabled) one or more syntax elements on a coefficient-by-coefficient basis for coefficients in a residual block in a first pass and after the first pass, decode a syntax element on the coefficient-by-coefficient basis for coefficients in the residual block in a second pass.

As an example, prediction processing unit 304 may determine that the current block is coded in transform-skip mode (e.g., based on information signaled by video encoder 200), meaning that the operation of inverse transform processing unit 308 may be skipped. In this example, reconstruction unit 310 receives coefficients (e.g., residual values since inverse transform is skipped) that are decoded by entropy decoding unit 302.

Entropy decoding unit 302 may decode, in an interleaving manner (e.g., based on transform skip being enabled), coefficient information on a coefficient-by-coefficient basis for coefficients in a residual block of a current block in a first pass. For example, entropy decoding unit 302 may determine the coefficient information for each coefficient in the residual block. The coefficient information for a coefficient includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values.

In this example, to decode, in the interleaving manner (e.g., based on transform skip being enabled), the coefficient information, entropy decoding unit 302 may context-based decode (e.g., such as CABAC), in the interleaving manner, coefficient information on the coefficient-by-coefficient basis until a coded bin count limit is reached. For example, entropy decoding unit 302 may determine the coded bin count limit (e.g., 2*block width*block height or may be signaled by video encoder 200), and track how many of bins of the coded bin count limit are used. When the number of bins reaches (e.g., is greater than or equal to) the coded bin count limit (e.g., after the coded bin count limit is reached), entropy decoding unit 302 may bypass decode, in the interleaving manner, coefficient information on the coefficient-by-coefficient basis.

After the first pass, entropy decoding unit 302 may decode remainder information for coefficients in the residual block of the current block in a second pass. To decode the remainder information, entropy decoding unit 302 may bypass decode the remainder information.

In one or more examples, entropy decoding unit 302 may parse, in the interleaving manner, coefficient information on the coefficient-by-coefficient basis for coefficients in the residual block of the current block in the first pass. Entropy decoding unit 302 may parse remainder information for coefficients in the residual block of the current block in the second pass.

Figure 11:
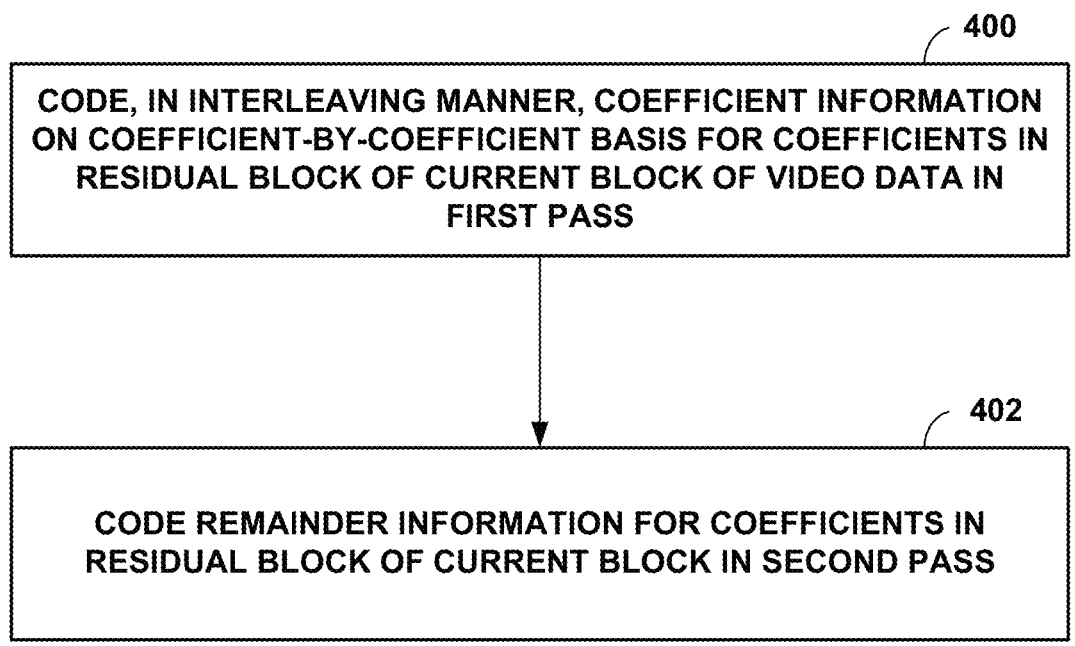
FIG. 11 is a flowchart illustrating an example method for coding video data.

FIG. 11 is a flowchart illustrating an example method for coding video data. For example, processing circuitry of a video coder (e.g., video encoder 200 or video decoder 300) may determine that a current block of the video data is coded (e.g., encoded or decoded) in transform-skip mode. Based on the current block being coded in transform-skip mode, the processing circuitry of the video coder may be configured to perform the example techniques.

The processing circuitry of the video coder (e.g., such as with entropy encoding unit 220 or entropy decoding unit 302) may code, in an interleaving manner, coefficient information on a coefficient-by-coefficient basis for coefficients in a residual block of a current block of the video data in a first pass (400). The coefficient information for a coefficient includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values.

As one example, to code in the interleaving manner, the coefficient information, the processing circuitry of the video coder (e.g., such as with entropy encoding unit 220 or entropy decoding unit 302) may context-based code (e.g., CABAC), in the interleaving manner, coefficient information on the coefficient-by-coefficient basis until a coded bin count limit is reached. In this example, the processing circuitry of the video coder (e.g., such as with entropy encoding unit 220 or entropy decoding unit 302) may bypass code, in the interleaving manner, coefficient information on the coefficient-by-coefficient basis after the coded bin count limit is reached.

After the first pass, the processing circuitry of the video coder (e.g., such as with entropy encoding unit 220 or entropy decoding unit 302) may code remainder information for coefficients in the residual block of the current block in a second pass (402). For example, to code the remainder information, the processing circuitry may bypass code the remainder information.

As one example, to code remainder information, the processing circuitry of the video coder may be configured to code remaining information. In this example, the coded bin count limit is reached during the coding of the particular coefficient. The processing circuitry of the video coder may be configured to code respective values of coefficients following the particular coefficient. As one example, the processing circuitry of the video coder may code information indicative of a difference between absolute values of respective values of the coefficients following the particular coefficient and 1.

In one or more examples, the processing circuitry of the video coder, such as in examples where the video coder is video encoder 200, may signal, in the interleaving manner, the coefficient information on the coefficient-by-coefficient basis for coefficients in the residual block of the current block in the first pass, and signal remainder information for coefficients in the residual block of the current block in the second pass. In one or more examples, the processing circuitry of the video coder, such as in examples where the video coder is video decoder 300, may parse, in the interleaving manner, the coefficient information on the coefficient-by-coefficient basis for coefficients in the residual block of the current block in the first pass, and parse remainder information for coefficients in the residual block of the current block in the second pass.

The following are some example techniques that may be used alone or in combination.

Example 1

A method of coding video data, the method comprising determining that transform skip is enabled and coding a coefficient value for a coefficient in a residual block based on one or more coefficient values of one or more neighboring coefficients.

Example 2

The method of example 1, wherein the one or more neighboring coefficients comprise a left coefficient and an above coefficient.

Example 3

The method of any of examples 1 and 2, wherein coding the coefficient value comprises one of for encoding the coefficient value, mapping a coefficient absolute level of the coefficient to a modified value based on the one or more coefficient values of the one or neighboring coefficients or for decoding the coefficient value, inverse mapping the modified value to the coefficient absolute level of the coefficient based on the one or more coefficient values of the one or more neighboring coefficients.

Example 4

A method of coding video data, the method comprising coding in an interleaving manner one or more syntax elements on a coefficient-by-coefficient basis for coefficients in a residual block in a first pass and after the first pass, coding a syntax element on the coefficient-by-coefficient basis for coefficients in the residual block in a second pass.

Example 5

The method of example 4, wherein the one or more syntax elements coded in the first pass comprise one or more of the sig_coeff_flag, par_level_flag, coeff_sign_flag, and all abs_level_gtX_flags, examples of which are described in the disclosure.

Example 6

The method any of examples 4 and 5, wherein the syntax element coded in the second pass comprises the abs_remainder, examples of which are described in the disclosure.

Example 7

The method of any one or combination of examples 1-6.

Example 8

The method of any one or combination of examples 1-6, wherein coding comprises decoding.

Example 9

The method of any one or combination of examples 1-6, wherein coding comprises encoding.

Example 10

A device for coding video data, the device comprising a memory configured to store video data and a video coder comprising fixed-function or programmable circuitry, wherein the video coder is configured to perform the method of any one or combination of examples 1-6.

Example 11

The device of example 10, wherein the video coder comprises a video decoder.

Example 12

The device of example 10, wherein the video coder comprises a video encoder.

Example 13

The device of any of examples 10-12, further comprising a display configured to display decoded video data.

Example 14

The device of any of examples 10-13, wherein the device comprises one or more of a camera, a computer, a mobile device, a broadcast receiver device, or a set-top box.

Example 15

A computer-readable storage medium having stored thereon instructions that, when executed, cause one or more processors to perform the method of any one or combination of examples 1-6.

Example 16

A device for coding video data, the device comprising means for performing the method of any one or combination of examples 1-6.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    coding, in an interleaving manner, coefficient information on a coefficient-by-coefficient basis for coefficients in a residual block of a current block of the video data in a first pass through the coefficients in the residual block, wherein the coefficients in the residual block comprise a first coefficient indicative of a difference between a first sample of the current block and a first sample of a prediction block and a second coefficient indicative of a difference between a second sample of the current block and a second sample of the prediction block, wherein the coefficient information includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values,
    wherein coding, in the interleaving manner, the coefficient information comprises coding, in the first pass, two or more of a first significance flag, a first parity flag, a first sign flag, and a first set of one or more greater than flags for the first coefficient, and after the coding of the two or more of the first significance flag, the first parity flag, the first sign flag, and the first set of one or more greater than flags for the first coefficient, coding, in the first pass, two or more of a second significance flag, a second parity flag, a second sign flag, and a second set of one or more greater than flags for the second coefficient,
    wherein coding, in the interleaving manner, the coefficient information further comprises:
        context-based coding, in the interleaving manner, the coefficient information on the coefficient-by-coefficient basis until a coded bin count limit is reached; and
        bypass coding, in the interleaving manner, the coefficient information on the coefficient-by-coefficient basis after the coded bin count limit is reached; and
    after the first pass, coding remainder information for coefficients in the residual block of the current block in a second pass through the coefficients in the residual block, wherein the remainder information comprises remaining absolute values of the coefficients in the residual block,
    wherein coding the remainder information comprises:
        coding information indicative of a remaining absolute value of a particular coefficient, wherein the coded bin count limit is reached during the coding of the particular coefficient; and
        coding respective values of coefficients following the particular coefficient.

2. The method of claim 1, wherein coding the respective values of the coefficients comprises coding information indicative of respective differences between absolute values of respective values of the coefficients following the particular coefficient and 1.

3. The method of claim 1, wherein coding the remainder information comprises bypass coding the remainder information.

4. The method of claim 1, further comprising:
    determining that the current block is coded in transform-skip mode,
    wherein coding, in the interleaving manner, and coding the remainder information comprises coding, in the interleaving manner, and coding the remainder information based on the current block being coded in the transform-skip mode.

5. The method of claim 1,
    wherein coding, in the interleaving manner, comprises parsing, in the interleaving manner, the coefficient information on the coefficient-by-coefficient basis for coefficients in the residual block of the current block in the first pass, and
    wherein coding the remainder information comprises parsing the remainder information for coefficients in the residual block of the current block in the second pass.

6. The method of claim 1,
    wherein coding, in the interleaving manner, comprises signaling, in the interleaving manner, the coefficient information on the coefficient-by-coefficient basis for coefficients in the residual block of the current block in the first pass, and
    wherein coding the remainder information comprises signaling the remainder information for coefficients in the residual block of the current block in the second pass.

7. A device for coding video data, the device comprising:
    a memory configured to store video data; and
    processing circuitry configured to:
        code, in an interleaving manner, coefficient information on a coefficient-by-coefficient basis for coefficients in a residual block of a current block of the video data in a first pass through the coefficients in the residual block, wherein the coefficients in the residual block comprise a first coefficient indicative of a difference between a first sample of the current block and a first sample of a prediction block and a second coefficient indicative of a difference between a second sample of the current block and a second sample of the prediction block, wherein the coefficient information includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values, wherein to code, in the interleaving manner, the coefficient information, the processing circuitry is configured to code, in the first pass, two or more of a first significance flag, a first parity flag, a first sign flag, and a first set of one or more greater than flags for the first coefficient, and after the coding of the two or more of the first significance flag, the first parity flag, the first sign flag, and the first set of one or more greater than flags for the first coefficient, code, in the first pass, two or more of a second significance flag, a second parity flag, a second sign flag, and a second set of one or more greater than flags for the second coefficient, wherein to code, in the interleaving manner, the coefficient information, the processing circuitry is further configured to:
  context-based code, in the interleaving manner, coefficient information on the coefficient-by-coefficient basis until a coded bin count limit is reached; and
  bypass code, in the interleaving manner, coefficient information on the coefficient-by-coefficient basis after the coded bin count limit is reached; and
after the first pass, code remainder information for coefficients in the residual block of the current block in a second pass through the coefficients in the residual block, wherein the remainder information comprises remaining absolute values of the coefficients in the residual block,
wherein to code the remainder information, the processing circuitry is configured to:
  code information indicative of a remaining absolute value of a particular coefficient, wherein the coded bin count limit is reached during the coding of the particular coefficient and
  code respective values of coefficients following the particular coefficient.

8. The device of claim 7, wherein to code the respective values of the coefficients, the processing circuitry is configured to code information indicative of respective differences between absolute values of respective values of the coefficients following the particular coefficient and 1.

9. The device of claim 7, wherein to code the remainder information, the processing circuitry is configured to bypass code the remainder information.

10. The device of claim 7, wherein the processing circuitry is configured to:
  determine that the current block is coded in transform-skip mode,
  wherein to code, in the interleaving manner, and code the remainder information, the processing circuitry is configured to code, in the interleaving manner, and code the remainder information based on the current block being coded in the transform-skip mode.

11. The device of claim 7,
wherein the processing circuitry comprises a video decoder,
wherein to code, in the interleaving manner, the processing circuitry is configured to parse, in the interleaving manner, the coefficient information on the coefficient-by-coefficient basis for coefficients in the residual block of the current block in the first pass, and
wherein to code the remainder information, the processing circuitry is configured to parse the remainder information for coefficients in the residual block of the current block in the second pass.

12. The device of claim 7,
wherein the processing circuitry comprises a video encoder,
wherein to code, in the interleaving manner, the processing circuitry is configured to signal, in the interleaving manner, the coefficient information on the coefficient-by-coefficient basis for coefficients in the residual block of the current block in the first pass, and
wherein to code the remainder information, the processing circuitry is configured to signal the remainder information for coefficients in the residual block of the current block in the second pass.

13. The device of claim 7, wherein the device comprises one or more of a camera, a computer, a mobile device, a broadcast receiver device, or a set-top box.

14. A non-transitory computer-readable storage medium having stored thereon instructions that, when executed, cause one or more processors to:
  code, in an interleaving manner, coefficient information on a coefficient-by-coefficient basis for coefficients in a residual block of a current block of the video data in a first pass through the coefficients in the residual block, wherein the coefficients in the residual block comprise a first coefficient indicative of a difference between a first sample of the current block and a first sample of a prediction block and a second coefficient indicative of a difference between a second sample of the current block and a second sample of the prediction block, wherein the coefficient information includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values,
  wherein the instructions that cause the one or more processors to code, in the interleaving manner, the coefficient information comprise instructions that cause the one or more processors to code, in the first pass, two or more of a first significance flag, a first parity flag, a first sign flag, and a first set of one or more greater than flags for the first coefficient, and after the coding of the two or more of the first significance flag, the first parity flag, the first sign flag, and the first set of one or more greater than flags for the first coefficient, code, in the first pass, two or more of a second significance flag, a second parity flag, a second sign flag, and a second set of one or more greater than flags for the second coefficient, wherein the instructions that cause the one or more processors to code, in the interleaving manner, the coefficient information further comprise instructions that cause the one or more processors to:
   context-based code, in the interleaving manner, coefficient information on the coefficient-by-coefficient basis until a coded bin count limit is reached; and
   bypass code, in the interleaving manner, coefficient information on the coefficient-by-coefficient basis after the coded bin count limit is reached; and
after the first pass, code remainder information for coefficients in the residual block of the current block in a second pass through the coefficients in the residual block, wherein the remainder information comprises remaining absolute values of the coefficients in the residual block,
wherein the instructions that cause the one or more processors to code the remainder information comprise instructions that cause the one or more processors to:
   code information indicative of a remaining absolute value of a particular coefficient, wherein the coded bin count limit is reached during the coding of the particular coefficient; and
   code respective values of coefficients following the particular coefficient.

15. The non-transitory computer-readable storage medium of claim 14, wherein the instructions that cause the one or more processors to code the respective values of the coefficients comprise instructions that cause the one or more processors to code information indicative of respective differences between absolute values of respective values of the coefficients following the particular coefficient and 1.

16. The non-transitory computer-readable storage medium of claim 14, wherein the instructions that cause the one or more processors to code the remainder information comprise instructions that cause the one or more processors to bypass code the remainder information.

17. The non-transitory computer-readable storage medium of claim 14, further comprising instructions that cause the one or more processors to:
   determine that the current block is coded in transform-skip mode,
   wherein the instructions that cause the one or more processors to code, in the interleaving manner, and code the remainder information comprise instructions that cause the one or more processors to code, in the interleaving manner, and code the remainder information based on the current block being coded in the transform-skip mode.

18. The non-transitory computer-readable storage medium of claim 14,
   wherein the instructions that cause the one or more processors to code, in the interleaving manner, comprise instructions that cause the one or more processors to parse, in the interleaving manner, the coefficient information on the coefficient-by-coefficient basis for coefficients in the residual block of the current block in the first pass, and
   wherein the instructions that cause the one or more processors to code the remainder information comprise instructions that cause the one or more processors to parse the remainder information for coefficients in the residual block of the current block in the second pass.

19. The non-transitory computer-readable storage medium of claim 14,
   wherein the instructions that cause the one or more processors to code, in the interleaving manner, comprise instructions that cause the one or more processors to signal, in the interleaving manner, the coefficient information on the coefficient-by-coefficient basis for coefficients in the residual block of the current block in the first pass, and
   wherein the instructions that cause the one or more processors to code the remainder information comprise instructions that cause the one or more processors to signal the remainder information for coefficients in the residual block of the current block in the second pass.

20. A device for coding video data, the device comprising:
means for coding, in an interleaving manner, coefficient information on a coefficient-by-coefficient basis for coefficients in a residual block of a current block of the video data in a first pass through the coefficients in the residual block, wherein the coefficients in the residual block comprise a first coefficient indicative of a difference between a first sample of the current block and a first sample of a prediction block and a second coefficient indicative of a difference between a second sample of the current block and a second sample of the prediction block, wherein the coefficient information includes one or more of a significance flag indicating whether a value of the coefficient is not zero, a parity flag indicating whether the value of the coefficient is odd or even, a sign flag indicating whether the value of the coefficient is positive or negative, and one or more greater than flags indicating whether an absolute value of the coefficient is greater than respective threshold values,
wherein the means for coding, in the interleaving manner, the coefficient information comprises means for coding, in the first pass, two or more of a first significance flag, a first parity flag, a first sign flag, and a first set of one or more greater than flags for the first coefficient, and coding, in the first pass, one or more of a second significance flag, a second parity flag, a second sign flag, and a second set of one or more greater than flags for the second coefficient after the coding of the two or more of the first significance flag, the first parity flag, the first sign flag, and the first set of one or more greater than flags for the first coefficient,
wherein the means for coding, in the interleaving manner, the coefficient information comprises:
   means for context-based coding, in the interleaving manner, coefficient information on the coefficient-by-coefficient basis until a coded bin count limit is reached; and
   means for bypass coding, in the interleaving manner, coefficient information on the coefficient-by-coefficient basis after the coded bin count limit is reached; and
means for coding remainder information for coefficients in the residual block of the current block in a second pass, after the first pass, through the coefficients in the residual block, wherein the remainder information comprises remaining absolute values of the coefficients in the residual block,
wherein the means for coding the remainder information comprises:
   means for coding information indicative of a remaining absolute value of a particular coefficient, wherein the coded bin count limit is reached during the coding of the particular coefficient; and
   means for coding respective values of coefficients following the particular coefficient.

21. The device of claim 20,
wherein the means for coding, in the interleaving manner, comprises means for parsing, in the interleaving manner, the coefficient information on the coefficient-by-coefficient basis for coefficients in the residual block of the current block in the first pass, and
wherein the means for coding the remainder information comprises means for parsing the remainder information for coefficients in the residual block of the current block in the second pass.

22. The device of claim 20,
wherein the means for coding, in the interleaving manner, comprises means for signaling, in the interleaving manner, the coefficient information on the coefficient-by-coefficient basis for coefficients in the residual block of the current block in the first pass, and
wherein the means for coding the remainder information comprises means for signaling the remainder information for coefficients in the residual block of the current block in the second pass.

* * * * *